United States Patent
Ballard

(12) 
(10) Patent No.: US 10,072,198 B2
(45) Date of Patent: Sep. 11, 2018

(54) SELF SEALING FLUIDS

(71) Applicant: M-I Drilling Fluids UK Limited, Aberdeen (GB)

(72) Inventor: David Anthony Ballard, Stonehaven (GB)

(73) Assignee: M-I Drilling Fluids UK Limited, Aberdeen (GB)

( * ) Notice: Subject to any disclaimer, the term of this patent is extended or adjusted under 35 U.S.C. 154(b) by 0 days.

(21) Appl. No.: 15/289,405

(22) Filed: Oct. 10, 2016

(65) Prior Publication Data
US 2017/0233631 A1    Aug. 17, 2017

Related U.S. Application Data

(60) Provisional application No. 62/238,794, filed on Oct. 8, 2015.

(51) Int. Cl.
*E21B 33/138*    (2006.01)
*E21B 43/22*    (2006.01)
*E21B 21/00*    (2006.01)
*C09K 8/32*    (2006.01)
*C09K 8/035*    (2006.01)

(52) U.S. Cl.
CPC .............. *C09K 8/32* (2013.01); *C09K 8/035* (2013.01); *E21B 21/003* (2013.01); *E21B 33/138* (2013.01); *C09K 2208/08* (2013.01); *C09K 2208/10* (2013.01)

(58) Field of Classification Search
CPC ........ C09K 8/36; C09K 8/34; C09K 2208/02; C09K 8/28; C09K 8/032; C09K 8/32; C09K 2208/10; C09K 8/16; E21B 21/068; E21B 17/003; E21B 21/065; E21B 47/0006; E21B 47/12; E21B 21/066
See application file for complete search history.

(56) References Cited

U.S. PATENT DOCUMENTS 7,749,945 B2 *    7/2010    Xiang .................... C09K 8/36
166/305.1

* cited by examiner

*Primary Examiner* — Zakiya W Bates
(74) *Attorney, Agent, or Firm* — David J. Smith

(57) ABSTRACT

Methods for reducing loss of wellbore fluid to formation may include pumping an oil-based wellbore fluid into the wellbore, where the wellbore includes an oleaginous continuous phase and a plurality of modified brine phases dispersed in the oleaginous continuous phase.

17 Claims, 3 Drawing Sheets

SELF SEALING FLUIDS

CROSS REFERENCE TO RELATED APPLICATIONS

This application claims the benefit of U.S. Provisional Application No. 62/238,794 filed on Oct. 8, 2015, incorporated by reference herein in its entirety.

BACKGROUND

During the drilling of a wellbore, various fluids are used in the well for a variety of functions. The fluids may be circulated through a drill pipe and drill bit into the wellbore, and then may subsequently flow upward through wellbore to the surface. During this circulation, a drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

The selection of the type of a wellbore fluid to be used in a drilling application involves a careful balance of both the good and bad characteristics of the wellbore fluids in the particular application and the type of well to be drilled. Frequently, the selection of a fluid may depend on the type of formation through which the well is being drilled. Wellbore fluid compositions may be water- or oil-based and may comprise weighting agents, surfactants, proppants, and polymers. However, for a wellbore fluid to perform its functions and allow wellbore operations to continue, the fluid may stay in the borehole. Frequently, undesirable formation conditions are encountered in which substantial amounts or, in some cases, practically all of the wellbore fluid may be lost to the formation. For example, wellbore fluid can leave the borehole through large or small fissures or fractures in the formation or through a highly porous rock matrix surrounding the borehole. Thus, fluid loss or lost circulation is a recurring drilling problem, characterized by loss of wellbore fluids into downhole formations that are fractured, highly permeable, porous, cavernous, or vugular or can be artificially induced by excessive mud pressures.

There is an analogous need to seal and prevent fluid loss when recovering hydrocarbons from sand formations, particularly depleted sand formations. Depleted sand formations are productive, or formerly productive, hydrocarbon zones that have been produced, drawn down, or otherwise depleted of their content, creating a lower formation pressure than that of the fluid which may be in use in the well. Because of this pressure differential, the sand formation may be partially or completely seal to inhibit or prevent fluid loss of the mud into the sand.

To combat such mud losses into the formation, lost circulation treatments are attempted to plug or block the openings either naturally formed or induced by the drilling operation. Such lost circulation treatments have included a variety of treatment materials, including polymeric based treatments having sufficient strength and integrity to minimize lost circulation into voids in direct communication with the wellbore, such as fractures, fracture networks, vugs, washouts, cavities, and the like. For example, crosslinkable or absorbing polymers, loss control material (LCM) pills, and cement squeezes have been employed. These additives have found utility in preventing mud loss, stabilizing and strengthening the wellbore, and in zonal isolation and water shutoff treatments. Some typical viscosifying additives used in well fluids to combat fluid loss include natural polymers and derivatives thereof such as xanthan gum and hydroxyethyl cellulose (HEC). In addition, a wide variety of polysaccharides and polysaccharide derivatives may be used, as is known in the art.

Further, providing effective fluid loss control without damaging formation permeability in completion operations has been a prime requirement for an ideal fluid loss-control pill. Conventional fluid loss control pills include a variety of polymers or resins, calcium carbonate, and graded salt fluid loss additives, which have been used with varying degrees of fluid loss control. These pills achieve their fluid loss control from the presence of specific solids that rely on filter-cake build up on the face of the formation to inhibit flow into and through the formation. However, these additive materials can cause severe damage to near-wellbore areas after their application. This damage may reduce production levels if the formation permeability is not restored to its original level. Further, at a suitable point in the completion operation, the filter cake may be removed to restore the formation's permeability to its original level.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to methods for reducing loss of wellbore fluid to formation, where the method includes pumping an oil-based wellbore fluid into the wellbore, where the wellbore includes an oleaginous continuous phase and a plurality of modified brine phases dispersed in the oleaginous continuous phase, where the brine phases are modified such that upon the wellbore fluid undergoing fluid loss to the formation, the modified brine phases coalesce and form a seal on the walls of the formation.

In another aspect, embodiments discloses herein relate to methods for reducing loss of wellbore fluid in a wellbore to a formation, where the method includes pumping an oil-based wellbore fluid into a wellbore, where the oil-based wellbore fluid includes an oleaginous phase and a plurality of gelled brine phases emulsified in the oleaginous continuous phase.

In another aspect, embodiments discloses herein relate to methods for reducing loss of wellbore fluid in a wellbore to a formation, where the method includes pumping an oil-based wellbore fluid into a wellbore, where the oil-based wellbore fluid includes an oleaginous continuous phase, and a plurality of modified brine phases having particulate enhancements emulsified in the oleaginous phase.

Other aspects and advantages of the claimed subject matter will be apparent from the following description and the appended claims.

DETAILED DESCRIPTION

Figure 1:
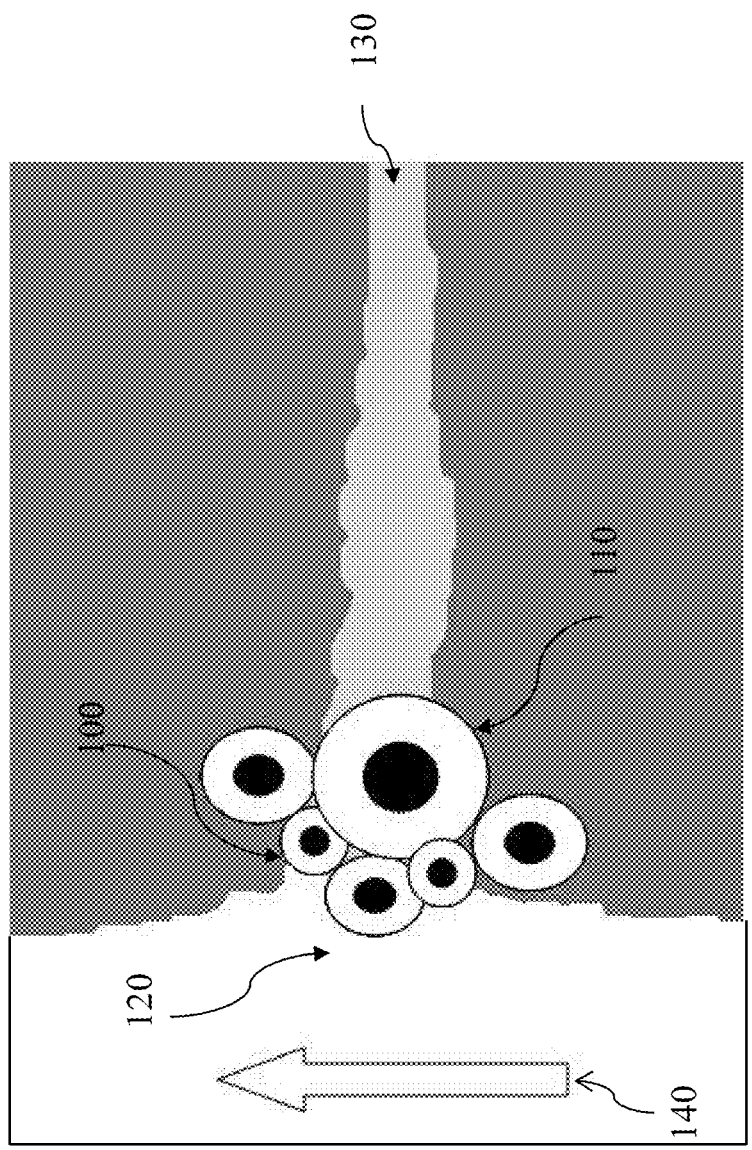
FIG. 1 illustrates a mechanism of reducing fluid loss, in accordance with embodiments of the present disclosure.

Generally, embodiments disclosed herein relate to methods of treating fluid loss in downhole formations. More specifically, embodiments disclosed herein relate to oil-based wellbore fluids for downhole applications formed of an oleaginous continuous phase and a plurality of modified brine phases dispersed or emulsified in the oleaginous continuous phase. The inventor of the present disclosure has found that brine phases dispersed or emulsified in an oleaginous continuous phase may be modified such that upon the wellbore fluid undergoing fluid loss to the formation, the modified brine phases may coalesce and form a seal or a plug on the walls of the formation.

The base fluids described herein may be oil-based wellbore fluids, such as an invert emulsion where a non-oleaginous phase is emulsed within an oleaginous continuous phase. In one or more embodiments, the oleaginous continuous phase is selected from the group including diesel oil, mineral oil, a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids. Generally, the amount of the oleaginous phase may be sufficient to form a stable emulsion when utilized as the continuous phase. The amount of oleaginous phase in the invert emulsion fluid may vary depending upon the particular oleaginous phase used, the particular non-oleaginous phase used, and the particular application in which the invert emulsion fluid is to be employed. The amount of non-oleaginous phase in the invert emulsion fluid may vary depending upon the particular non-oleaginous phase used, the emulsifier selected to stabilize the non-oleaginous phase, and the particular application in which the invert emulsion fluid is to be employed. In one or more embodiments, the oil based fluid may contain up to 60 or 70 or 80 vol. % water or other non-oleaginous phase, and at least 20, 30, 40, 50, 60, or 70 vol. % of oleaginous phase.

As mentioned above, the wellbore fluid may be an invert emulsion having a continuous oleaginous phase and a discontinuous aqueous (or non-oleaginous liquid) phase, among other substances and additives. Non-oleaginous liquids may, in some embodiments, include at least one of fresh water, sea water, brine, mixtures of water and water-soluble organic compounds, and mixtures thereof. In various embodiments, the non-oleaginous phase may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution.

According to the present embodiments, fluid loss control in a wellbore may be achieved by modifying a non-oleaginous discontinuous phase, such as a brine, which may be dispersed or emulsified in an oleaginous continuous phase, with the formation of a modified non-oleaginous or brine phase. The resulting emulsion droplets may coalesce into a mass that allows for seal and/or plug formation in the region of the wellbore that is experiencing fluid loss. As discussed herein, a non-oleaginous discontinuous phase may be modified through different mechanisms. Without being bond by the theory, it is believed that the mechanism of action of the modified brine phase is similar to blood clotting or paper making. For example, a non-oleaginous discontinuous phase may be modified by the addition of a polymer into the non-oleaginous discontinuous phase. Upon crosslinking the polymer with a crosslinker in the absence or the presence of particulate enhancements, a gelled non-oleaginous phase may form. In both scenarios, the polymer may be pre- or post-crosslinked. It is also envisioned that the non-oleaginous discontinuous phase may be modified by placing particulate enhancements in the brine droplets, or by forming or growing solids from the non-oleaginous phase droplets that coalesce to form larger particles. Upon entering a lost circulation zone, the wellbore fluid containing the modified brine may form a seal or a plug at an entrance of a fracture, fissure or vug or inside a fracture, fissure or vug, thereby reducing the loss circulation.

According to various embodiments, gelled brine phases may be formed by first mixing a polymer with a non-oleaginous phase. In one or more embodiments, after the addition of the polymer to non-oleaginous phase, the gelled brine phase may be mixed with an oleaginous continuous phase, to form an emulsion, i.e., the non-oleaginous discontinuous phase may be dispersed or emulsed in the oleaginous continuous phase. The polymer incorporated into the non-oleaginous phase may be pre- or post-crosslinked with a crosslinker (i.e., before or after the emulsification of the polymer/brine within the oleaginous fluid) to form a gelled brine.

In one or more embodiments, a gelled brine phase may be prepared by post-crosslinking the dispersed brine phase emulsion droplets that may contain a polymer. Upon post-adding a crosslinker to the brine, the crosslinker may migrate into the brine droplets and crosslink the polymer with the formation of the gelled brine. As noted above, it is also envisioned that the polymer may be pre-crosslinked. In such an embodiment, the polymer solution is pre-crosslinked by pre-adding a crosslinker with the formation of a gel. The gel may be afterwards mixed into the oleaginous continuous phase using a high speed blending mixer to effectively chop the gel into emulsion sized droplets.

According to various embodiments, the polymers used for the preparation of modified brines may be selected from the group of cationic polymers. The polymers that have shown utility in the wellbore fluids of this disclosure may be selected from the group of cationic partially hydrolyzed polyacrylamides, polyamines, linear and branched polyethylene imines and polymers with carboxylate functional groups. As noted above, the polymers may be pre- or post-crosslinked with a crosslinker, with the formation of a gelled brine prior to reaching a lost circulation zone. The crosslinkers that have shown utility in the wellbore fluids of this disclosure may be selected from the group of epoxies, isocyanates, carbodiimide, aziridine, oxazoline, or from the group of compounds containing Al, Ti and Zr ions. For example, in various embodiments, the cationic polymer may be a partially hydrolyzed polyacrylamide (PHPA) having a high or a medium molecular weight, which may be crosslinked with aluminum chlorohydrate. It is also contemplated that other combinations polymer/crosslinker may be used. In one or more embodiments, polymers selected from the group of polyamines, linear and branched polyethyleneimines may be crosslinked with organic crosslinkers such as epoxies, isocyanates and carbodiimide. In yet other embodiments, polymers with carboxylate functional groups may be crosslinked with inorganic crosslinkers selected from the group of inorganic compounds containing Al, Ti and Zr ions, or organic crosslinkers such as aziridine, carbodiimide and oxazoline. However, other combinations polymer/crosslinker may be used based on the chemical compatibility of the two components.

The crosslinker may be present in an amount effective to crosslink the polymer. The amount of crosslinker may affect the hardness of the resulting gelled brine. For example, in some embodiments, for a constant weight of polymer, increasing the amount of crosslinker may result in a higher crosslinking density, and therefore a harder gel.

It is also envisioned that the emulsion droplets of the oil-based wellbore fluids may include, besides the polymer, a plurality of particulate enhancements to enhance the self-sealing effect. The particulate enhancements that have shown utility in the present disclosure are selected from the group of nano sized materials, fumed silica, fibers and microcrystalline cellulose.

In one or more embodiments, the wellbore fluid may include an oleaginous continuous phase and a plurality of modified brine phases. The plurality of modified brine phases may be obtained by dispersing a polymer and a plurality of particulate enhancements in the brine. As noted above, the polymer may be pre- or post-crosslinked. Upon formation of the emulsion, the crosslinked polymer and the particulate enhancements may be incorporated in the emulsion droplets 100 (as shown in FIG. 1) with the formation of at least semi-rigid droplets. Referring now to FIG. 1, FIG. 1 illustrates a mechanism of reducing fluid loss in a wellbore to a formation according to the present embodiment. As seen in FIG. 1, a wellbore fluid prepared according to the present embodiment is pumped into the wellbore. The wellbore fluid is circulated through the drill pipe, through the bit, and up the annular space between the pipe and the formation (as shown by arrow 140 in FIG. 1) or steel casing to the surface. Upon coalescence of the emulsion droplets 100 into larger droplets (such as, for example 110), a plug or a seal 120 may form at the entrance or inside of a fractured formation 130, thus helping to seal a lost circulation zone.

It is also envisioned that brine phases may be modified by dispersing particulate enhancements into the brine phases. The type and the concentration of the particulate enhancements used depend on the particular type of well conditions and may be tailored depending on the severity of the fluid loss since the size of the fracture taking mud is seldom known. In various embodiments, the particulate enhancements may be selected from a variety of fibers, which optionally may be coated. While some embodiments may use a synthetic fiber, other embodiments may include either a naturally occurring fibrous material, and/or a synthetic fibrous material, wherein the fibrous material may provide additional compressive strength to the resulting plug or seal. In one or more embodiments, the fibers may be selected from the group of polyesters, acrylic polymers, polyamides, polyolefins, polyaramides, polyurethanes, vinyl polymers, glass fibers, carbon fibers, regenerated cellulose (rayon), natural fibers or blends thereof. Fibers that have shown utility in the present disclosure are micro crystalline cellulose fibers. Upon formation of the emulsion, the fibers may be dispersed in the brine droplets. In such an embodiment, the fibers may stick together with the formation of clumps or micro flocs. As a result, the droplets break and coalesce into larger particles or clots akin to blood clotting when a plug may be formed, reducing the fluid loss control in the formation. In one or more embodiments, the brine may be modified by using a combination of nano cellulose and a low molecular weight cationic polymer. Experimental data shows that such a brine performs very well in sand flow tests, despite its low viscosity. Without being bound by the theory, it is believed that the cationic polymer adsorbs onto the cellulose fibers, forming micro flocs when the droplets break and coalesce.

It is also envisioned that the modified brine phases may be prepared by forming or growing solids from the brine droplets. When the droplets coalesce with another droplet, and/or adsorb on a solid surface, or are activated by another trigger in a loss zone, such as for example a change in the fluid composition, the additives in the droplet are released and stick together to form a larger particle. In such an embodiment, polymers may be dispersed in a non-aqueous oil immiscible phase such as cellulose acetate polymer in ethylene glycol that comes out of solution as the water content rises to produce a sticky polymer film.

The wellbore fluids of the present application may further contain additional chemicals depending upon the end use of the fluid so long as they do not interfere with the functionality of the fluids (particularly the emulsion when using invert emulsion fluids) described herein. For example, weighting agents, emulsifiers, wetting agents, organophilic clays, viscosifiers, surfactants, dispersants, interfacial tension reducers, pH buffers, mutual solvents, thinners, thinning agents and cleaning agents may be added to the fluid compositions of this disclosure for additional functional properties.

As noted above, the wellbore fluid of the present disclosure additionally includes a weighting material, sometimes referred to as a weighting agent. Weighting agents are conventionally used in wellbore fluids to balance the pressure requirements of the well. The quantity and nature of the solid weighting agent may depend upon the desired density and viscosity of the final composition. Weighting agents may be selected from one or more of the materials including, for example, barite, hematite, iron oxide, calcium carbonate, magnesium carbonate, organic and inorganic salts of magnesium, calcium chloride, calcium bromide, magnesium chloride, zinc halides and combinations thereof. The weighting agents may be added in order to obtain a drilling fluid density of less than about 24, 21, or less than about 19.5 pounds per gallon.

Surfactants and wetting agents that may be suitable for use in the wellbore fluid include crude tall oil, oxidized crude tall oil, surfactants, organic phosphate esters, modified imidazolines and amidoamines, alkyl aromatic sulfates and sulfonates, and the like, and combinations or derivatives of these. However, when used with an invert emulsion fluid, the use of fatty acid wetting agents should be minimized so as to not adversely affect the reversibility of the invert emulsion disclosed herein. Faze-Wet™, VersaCoat™, SureWet™, SureMul™, Versawet™ and Versawet™ NS are examples of commercially available surfactants and wetting agents manufactured and distributed by M-I L.L.C. that may be used in the fluids disclosed herein.

Organophilic clays, normally amine treated clays, may be useful as viscosifiers and/or emulsion stabilizers in the fluid composition disclosed herein. Other viscosifiers, such as oil soluble polymers, polyamide resins, polycarboxylic acids and soaps can also be used. The amount of viscosifier used in the composition can vary upon the end use of the composition. However, normally about 0.1% to 6% by weight range is sufficient for most applications. VG-69™ and VG-PLUS™ are organoclay materials distributed by M-I L.L.C. (Houston, Tex.) that may be used in the fluid composition.

Emulsifiers that may be used in the fluids disclosed herein include, for example, fatty acids, soaps of fatty acids, amidoamines, polyamides, polyamines, oleate esters, such as sorbitan monoleate, sorbitan dioleate, imidazoline derivatives or alcohol derivatives and combinations or derivatives of the above. Additionally, lime or other alkaline materials may be added to conventional invert emulsion drilling fluids and muds to maintain a reserve alkalinity.

Conventional methods can be used to prepare the wellbore fluids disclosed herein, in a manner analogous to those normally used to prepare conventional oil-based wellbore fluids. In one embodiment, a desired quantity of oleaginous fluid such as a base oil and a suitable amount of an emulsifier are mixed together and the remaining components are added sequentially with continuous mixing. The non-oleaginous phase may be prepared by combining the polymer and/or particulate enhancements into the selected brine with continuous mixing. An invert emulsion may also be formed by vigorously agitating, mixing or shearing the oleaginous fluid and the non-oleaginous fluid.

A wellbore fluid according to the present disclosure may be used in a method for drilling a well into a subterranean formation in a manner similar to those wherein conventional wellbore fluids are used. In the process of drilling the well, a wellbore fluid is circulated through the drill pipe, through the bit, and up the annular space between the pipe and the formation (as shown by arrow 140 in FIG. 1) or steel casing to the surface. The wellbore fluid performs several different functions, such as cooling the bit, removing drilled cuttings from the bottom of the hole, suspending the cuttings and weighting material when the circulation is interrupted. In addition, the wellbore fluids of the present disclosure may provide filtration control to prevent excessive loss of wellbore fluids into the formation. The term "filtration control," as used herein, refers to any reduction of fluid loss into the formation achieved by use of the wellbore fluids of the present disclosure.

One embodiment of the present disclosure involves a method of reducing loss of wellbore fluid in a wellbore to a formation. In one such illustrative embodiment, the method comprises pumping an oil-based wellbore fluid into the wellbore. The oil-based wellbore fluid includes an oleaginous continuous phase and a plurality of modified brine phases dispersed in the oleaginous continuous phase. The brine phases may be modified such that upon the wellbore undergoing fluid loss to the formation, the modified brine phases coalesce and form a seal on the walls of the formation. In one or more embodiments, the oil-based wellbore fluid may include a plurality of gelled brine phases emulsified in the oleaginous continuous phase. In yet another embodiment, the oil-based wellbore fluid may include a plurality of modified brine phases having particulate enhancements emulsified in the oleaginous phase.

The performance of the formulations of this disclosure in controlling the filtrate loss from the wellbore fluid were determined by conducting the following tests.

Rheology Test

Viscosity may be measured by using a Brookfield DV-II+ Viscometer. One of skill in the art will appreciate that the viscosity measurements will be dependent upon the temperature of the gel composition, the type of spindle, and the number of revolutions per minute. The viscosity ranges disclosed herein were measured at 20° C. using a Brookfield DV II+ Viscometer with a LV2 spindle. The viscosity may be measured by lowering the viscometer into the center of the sample until the spindle is immersed in the middle of the immersion mark. Care should be taken not to trap air under the spindle. The viscometer can be started after adjusting the viscometer to the desired RPM. If more than one RPM is to be used, the viscometer should be started at the lowest desired RPM. This reduces the amount of shear introduced to the sample, resulting in more accurate readings at lower RPM's.

Yield Point Test

Yield point (YP) is a rheological parameter used in the calculation of viscosity characteristics of drilling fluids, measured in pounds per 100 feet square (lb/100 ft$^2$). The physical meaning of the Yield Point (YP) is the resistance to initial flow. YP is used to evaluate the ability of mud to lift cuttings out of the annulus. The Bingham plastic fluid plots as a straight line on a shear-rate (x-axis) versus shear stress (y-axis) plot, in which YP is the zero-shear-rate intercept (PV is the slope of the line). YP is calculated from 300-rpm and 600-rpm viscometer dial readings by subtracting PV from the 300-rpm dial reading and it is reported as lbf/100 ft$^2$. A higher YP implies that drilling fluid has the ability to carry cuttings better than a fluid of similar density but lower YP.

Invasion Test

As noted above, upon the wellbore fluid undergoing fluid loss to the formation, the modified brine phases coalesce and block pores in the formation with the build-up of a plug or seal as shown in FIG. 1. The depth of invasion may be from a few millimeters to (occasionally) many centimeters.

EXAMPLES

The following examples are provided to further illustrate the application and the use of the methods of the present disclosure. The present examples tested different wellbore fluids formulations to asses their rheological properties while providing increased viscosity upon modified brine phases coalesce. The experimental studies were performed in moderate stress testing conditions at a high temperature limit of 250° F.

The first option of a wellbore fluid used as control for comparison with a formulation (as shown in Table 1) is a standard oil-based wellbore fluid comprising an oil base, a brine and barite. The fluids used a variety of additives which are commercially available from M-I LLC (Houston, Tex.). SUREMUL® PLUS is an amidoamine emulsifier that provides emulsion stability, preferential wetting of solids by the continuous phase, filtration control and temperature stability. SUREWET' is a wetting agent and emulsifier used for thermal stability, filtration control and reducing water contamination. VG-SUPREME is a high-performance rheological additive for invert emulsion and oil drilling fluids that provides anti-sag features and exhibits a very rapid yield under low-shear and low-temperature conditions. The oil base formulation as described in Table 1 was further used to prepare different wellbore fluid formulations as shown below in Table 2.

TABLE 1

Oil base formulation

|  | Specific gravity | Volume % |
|---|---|---|
| DF1 | 0.8 | 94.4 |
| SUREMUL PLUS | 0.96 | 4.0 |
| SUREWET ™ | 0.96 | 0.5 |
| VG-SUPREME | 2 | 1.0 |
| Lime | 2 | 0.15 |
| Total |  | 100 |

TABLE 2

Oil based-wellbore fluid formulations

| Formulation |  | Per ½ bbl |  | Observations |
|---|---|---|---|---|
| Oil base | 206.5 ml | 103 ml | 84.8 g |  |
| Brine | 121.5 ml | 61 ml |  | plus polymer |
| Barite | 90 g | 45 g | 45 g | solids free, not added in the test series |
| Lime | 1 g | 0.5 g | 0.5 g |  |

Figure 2:
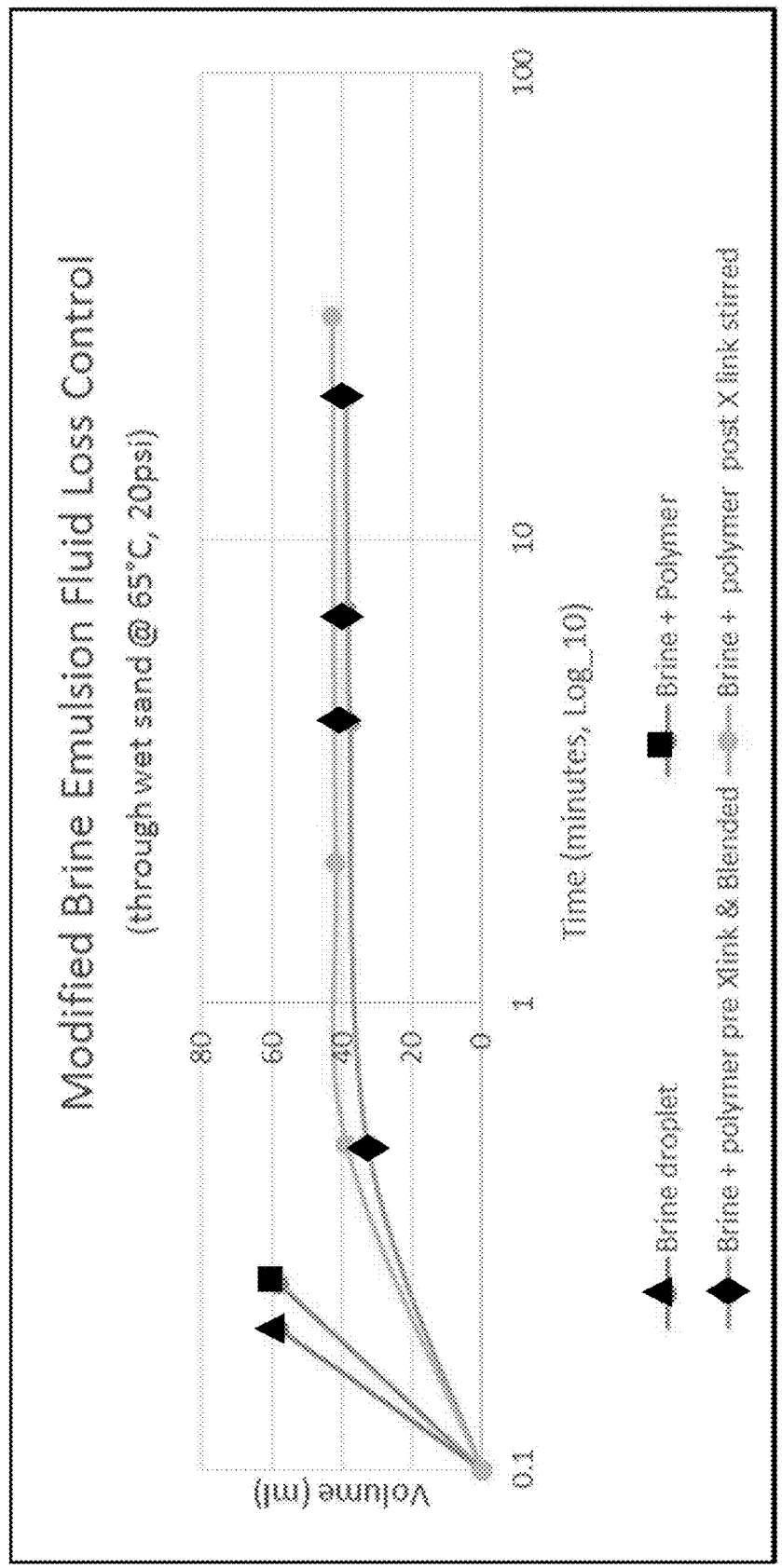
FIG. 2 illustrates a fluid loss control comparison of modified brines, in accordance with embodiments of the present disclosure.
Figure 3:
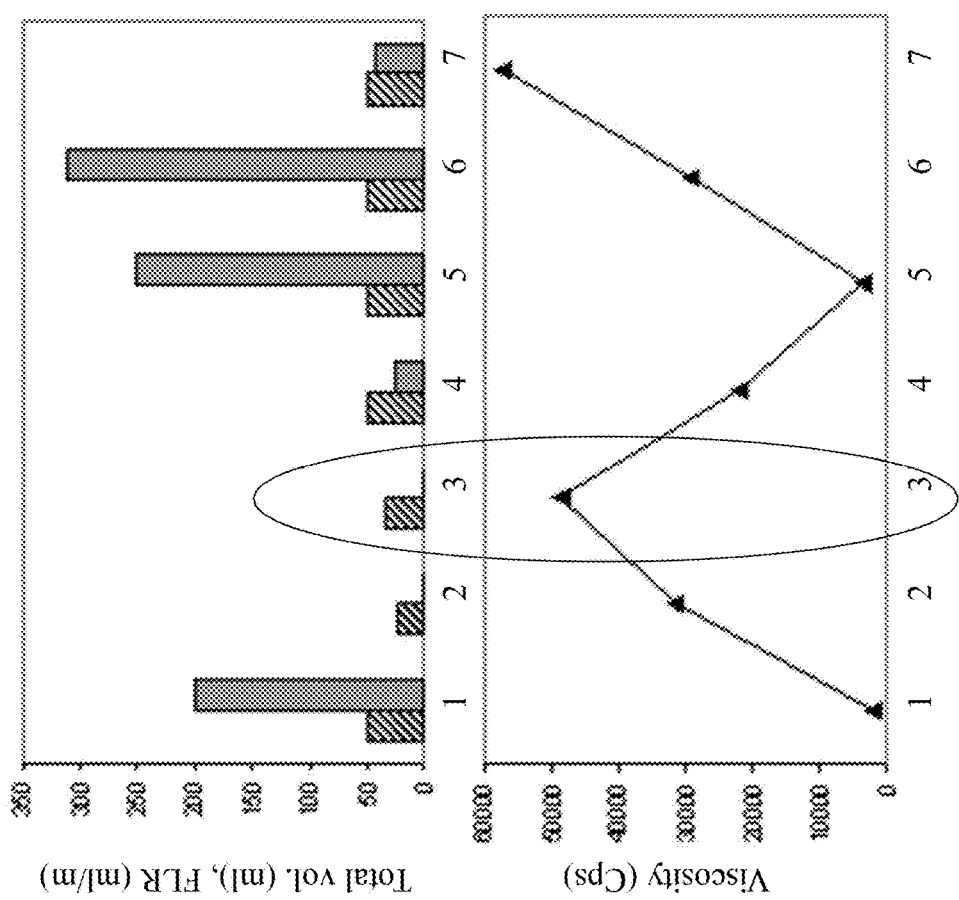
FIG. 3 illustrates a fluid loss control and viscosity comparison of modified brines, in accordance with embodiments of the present disclosure.

The fluid loss control was evaluated by passing the control and the modified brine emulsions through wet sand at 65° C. and 20 psi. A comparative analysis is shown in FIG. 2. As seen in FIG. 2, the control brine emulsion droplets pass through the sand in few seconds. As compared to the control sample, a small increase in the time in which the formulation passes through the sand is observed when a polymer is added. As seen from FIG. 2, the addition of a crosslinked polymer to the control sample results in a gelled brine with a much higher viscosity than the standard control brine. This is observed in the case the polymer is pre-crosslinked or post-crosslinked. This demonstrates that upon crosslinking the polymer, rigid gel droplets form which stick together and stop the filtration through the sand, improving the fluid loss. To fully asses the rheological properties of various formulations prepared in accordance with the present embodiments, the rheology was measured using a Fann Viscometer at the rpm indicated. A comparative analysis of these formulations with formulations containing MMH (mixed metal hydroxide) and bentonite is shown below in FIG. 3 and Table 3. The formulations were prepared using bentonite, MMH, a polymer (such as DRISCAL® D, available from Chevron Phillips Chemical), as well as a crosslinked polymer (XC). The MMH fluids with bentonite may be used primarily as a means of attaining the high gel strength and thixotropy. Mixed metal hydroxide particles are cationic, and when used in conjunction with an anionic colloid, such as bentonite, produce a very-rapidly-gelling drilling fluid with a high gel strength. According to experimental findings shown in Table 3 and FIG. 3, the formulations according to the present embodiments exhibit low viscosity and invasion characteristics similar to a fluid prepared using 12 lb/bbl bentonite/MMH that has a YP of approximately 60 and a viscosity of approximately

TABLE 3

Sample formulations and rheology data

|  | Sample 1 | Sample 2 | Sample 3 | Sample 4 | Sample 5 | Sample 6 | Sample 7 |
|---|---|---|---|---|---|---|---|
| Sample name | 17.5 Bentonite | 17.5 Bentonite and MMH | 12 Bentonite and MMH | 8.7 Bentonite and MMH | 1% Driscal D | 1% XC | 2% XC |
| Rheo and Invasion Characteristics ||||||||
| Brook 1 rpm | 1980 | 31680 | 48600 | 21960 | 3720 | 29160 | 57120 |
| Fann YP | 11 | 188 | 58 | 74 | 41 | 40 | 73 |
| Fann 3 rpm | 6 | 120 | 48 | 35 | 10 | 19 | 39 |
| 20 psi Invasion Vol. (ml) | 50 | 22 | 35 | 50 | 50 | 50 | 50 |
| Time (m) | 0.25 | 30 | 30 | 2 | 0.2 | 0.16 | 1.16 |
| (FLR) (ml/m) | 200 | 1 | 1 | 25 | 250 | 313 | 43 |

To further demonstrate the performance of the wellbore fluids formulated in accordance with the teachings of the present disclosure, the rheological properties of formulations containing a polymer with a high molecular weight, PHPA and aluminum chlorohydrol were evaluated. HYPERFLOC® is a cationic polyacrylamide commercially available from Hychem, Inc. (Tampa, Fla.). The prepared formulations are shown in Table 4. The wellbore fluids were heat aged at 50° C. for 16 hours. The fluid loss data at 50 psi and 20 psi is shown below in Table 5.

TABLE 4

Control sample and various formulations prepared using a high molecular weight polymer

|  |  | Brook rheo at room temperature (cps) | | |
|---|---|---|---|---|
|  | Sample | 100 rpm | 50 rpm | 1 rpm |
| control | CP 904 brine polymer solution before any addition | 450 | 674 | 4080 |
| 8 | 60 ml CaCl$_2$ brine + 1 g HYPERFLOC® CP904 + 2 ml HYPERFLOC® CB 478 (pre added to the brine) | Too thick to measure | | |

TABLE 4-continued

Control sample and various formulations prepared
using a high molecular weight polymer

| | | Brook rheo at room temperature (cps) | | |
|---|---|---|---|---|
| | Sample | 100 rpm | 50 rpm | 1 rpm |
| 9 | 60 ml CaCl$_2$ brine + 1 g HYPERFLOC ® CP904 + 2 ml HYPERFLOC ® CP 645 (pre added to the brine) | 878 | 1339 | 9960 |
| 10 | 60 ml CaCl$_2$ brine + 1 g HYPERFLOC ® CP904 + 2 ml HYPERFLOC ® CP 757 (pre added to the brine) | 862 | 1256 | 7680 |

TABLE 6

Control sample and various formulations prepared
using a medium molecular weight polymer

| Sample | Addition to 60 ml CaCl$_2$ brine (dilution 50% liquor) | Observations |
|---|---|---|
| 11 | 2.5 g AS 3119 + 1 ml HYPERFLOC ® CB-478 | |
| 12 | 1.3 g AS 3119 + 0.5 ml HYPERFLOC ® CB-478 | The crosslinker was post added to samples mixed with a Heidolph mixer |
| 13 | 3.5 g AS 3119 + 1.4 ml HYPERFLOC ® CB-478 | |

TABLE 7

Rheology data for formulations including a medium molecular weight polymer

| Sample | | ES | Brookfield Viscosity in cP S63 spindle | | | | Lower BYV | Time to 50 ml in s | PPT Sand pack 65° C., 20 psi | | | |
|---|---|---|---|---|---|---|---|---|---|---|---|---|
| | | | 100 rpm | 50 rpm | 1 rpm | 0.5 rpm | BYV | | | spurt | 2 min | 15 min | 30 min |
| 11 | | 69 | | | | | | | | | | | |
| AHR | 50° C. 16 hrs | 56 | 85.2 | 129.6 | 2400 | 3840 | 4.44 | 1.44 | | 31 at 21 s | 37 | 41 | 42 |
| 12 | | 137 | | | | | | | | | | | |
| AHR | 50° C. 16 hrs | 109 | 81.6 | 122.4 | 2280 | 4080 | 4.08 | 1.8 | 6 | | | | |
| 13 | | 39 | | | | | | | | | | | |
| AHR | 50° C. 16 hrs | 49 | 103.2 | 158.4 | 2880 | 5520 | 5.52 | 2.64 | | 19 at 8 s | 21 | 22 | 23 |

TABLE 5

Fluid loss (FL) data for control sample and formulations including a high
molecular weight polymer

| Sample | ES | FL data at 50 psi | FL data at 20 psi |
|---|---|---|---|
| 8 | 123 | | |
| AHR 50° C./16 hr | 121 | 45 sec to 50 ml | 20 ml spurt; 23 ml at 2 mins; 24 ml at 10 mins; 25 ml at 15 mins; 25 ml at 20 mins |
| 9 | 188 | | |
| AHR 50° C./16 hr | 220 | 20 sec to 50 ml | 12 sec to 50 ml |
| 10 | 330 | | |
| AHR 50° C./16 hr | 328 | 15 sec to 50 ml | 11 sec to 50 ml |

Referring now to Table 6, Table 6 shows formulations prepared using a crosslinked cationic PHPA with a medium molecular weight, such as FLODRILL AS3119. Table 7 shows the fluid loss for such formulations. The viscosity of the emulsions formulated as shown in Table 6 has been checked on Brookfield (low viscosity range) and it has a typical viscosity, not being too thick. As seen in Table 7, the higher the polymer concentration, the lower the fluid loss.

To demonstrate the performance of the wellbore fluids formulated in accordance with the teachings of the present disclosure, the rheology of various formulations containing nano-scale materials added to the emulsion droplets was evaluated. Specifically, the polymer was crosslinked and nano-sized solids were added to the brine phase. The nano-scale materials were added with the purpose of enhancing the plugging effect and to reduce the polymer concentration. The liquid body armour was made using PHPA and fumed silica. The formulations are shown in Table 8. It was found that the addition of just fumed silica, such as Aerosil (commercially available from Evonik) as the nano-scale material, does not reduce the fluid loss as the concentration increases, unless the polymer is chemically crosslinked. It was also found that ES (electrical stability) increases with increasing the amount of fumed silica. The results are shown below in Table 9.

TABLE 8

Control sample and various formulations prepared
using a medium molecular weight polymer

| Sample | Addition |
|---|---|
| 14 | 1 g Aerosil 200, 0.5 g HYPERFLOC ® CP 904 mix on Waring and post add 1 ml CB 478 on Heidolph |
| 15 | 2 g Aerosil 200, 0.5 g HYPERFLOC ® CP 904 mix on Waring and post add 1 ml CB 478 on Heidolph |
| 16 | 3 g Aerosil 200, 0.5 g HYPERFLOC ® CP 904 mix on Waring and post add 1 ml CB 478 on Heidolph |

TABLE 9

Fluid loss (FL) data for formulations including fumed silica

| Sample | | ES | FL through wet sand at 20 psi and 65° C. | | | |
|---|---|---|---|---|---|---|
| | | | Spurt | 2-3 min | 16-18 min | 31-33 min |
| 14 AHR | 50° C. 16 hrs | 167 | 30 | 31 | 18 | 31.5 |
| 15 AHR | 50° C. 16 hrs | 214 | 25 | 30 | 17 | 32 |
| 16 AHR | 50° C. 16 hrs | 409 | 30 | 32 | 16 | 34 |

To further demonstrate the role of the particulate enhancements, various formulations were prepared by using micro crystalline cellulose (MCC), as shown below in Table 10. Experimental data obtained for these formulations are presented in Table 11, below. FLODRILL AS 3119 is a medium molecular weight cationic PHPA. HYPERFLOC® 757 is a low molecular weight polyamine available from Hychem Inc (Tampa, Fla.). As seen in Table 11, a mixture of micro crystalline cellulose and polyamine provides good fluid loss control, even if the viscosity of the formulation is low and the polymer is not crosslinked. In addition, it is also noted the unusual effect of the coagulants which keep the fibers dispersed.

TABLE 10

Formulations prepared using micro crystalline cellulose

| Sample | Addition to 60 ml CaCl$_2$ brine (dilution 50% liquor) | Observations |
|---|---|---|
| 17 | 3% MCC | |
| 18 | 3% MCC + 0.5 g FLODRILL AS 3119 | Medium molecular weight cationic PHPA |
| 19 | 3% MCC + 0.5 ml HYPERFLOC ® CP757 | Low molecular weight polyamine |

To further demonstrate the role of the micro crystalline cellulose in wellbore fluids, the rheology of formulations containing MCC and other types of cationic polymers was evaluated. The formulations are shown in Table 12. The experimental data is presented below in Table 13. DPMI is diphenylmethane diisocyanate commercially available from BASF. HYPERFLOC® CP 645 is a cationic polyDADMAC (polydiallyldimethylammonium chloride) coagulant with a low molecular weight. HYPERFLOC® CP 757 is a polyamine with a low molecular weight. As seen from Table 13, polyDADMAC does not provide fluid loss similar to the polyamine with a low molecular weight. As seen in Tables 11 and 13, the results for samples 19 (prepared using 3% MCC and 0.5 ml HYPERFLOC® CB757, as shown in Table 10) and 22 (prepared using 3% MCC and 1 ml HYPERFLOC® CB757, as shown in Table 12), are reproducible.

TABLE 12

Formulations prepared using micro crystalline cellulose and different cationic polymers

| Sample | Addition to 60 ml CaCl$_2$ brine (dilution 50% liquor) | Observations | Appearance |
|---|---|---|---|
| 20 | 3% MCC + 1 ml BASF DPMI | | smooth |
| 21 | 3% MCC + 1 ml HYPERFLOC ® CP 645 | Low molecular weight highly cationic poly DADMAC coagulant | lumpy MCC |
| 22 | 3% MCC + 1 ml HYPERFLOC ® CP 757 | Low molecular weight polyamine | smooth |

TABLE 11

Rheology data for formulations including micro crystalline cellulose

| Sample | | ES | Brookfield Viscosity in cP S63 spindle | | | | Time to 50 ml in s | PPT Sand pack 65° C., 20 psi | | | |
|---|---|---|---|---|---|---|---|---|---|---|---|
| | | | 100 rpm | 50 rpm | 1 rpm | BYV | | spurt | 2 min | 15 min | 30 min |
| 17 AHR | 50° C. 16 hrs | 124 or 2 | 134.4 | 213.6 | 4320 | 7.92 | 7 | 20 ml clear fluid, rest cloudy | | | |
| 18 AHR | 50° C. 16 hrs | 47-82 | 116.4 | 194.4 | 3600 | 7.8 | 61 | 20 ml clear fluid, rest cloudy | | | |
| 19 AHR | 50° C. 16 hrs | 76 | 135.8 | 232.8 | 4800 | 9.7 | | 15 | 17 | 18 | 19 |

TABLE 13

Rheology data for formulations including micro crystalline cellulose and other types of cationic polymers

| Sample | ES | Brookfield Viscosity in cP S63 spindle | | | | | Lower BYV | PPT Sand pack 65° C., 20 psi | | | | |
|---|---|---|---|---|---|---|---|---|---|---|---|---|
| | | 100 rpm | 50 rpm | 1 rpm | 0.5 rpm | BYV | | Time to 50 ml in s | spurt | 2 min | 15 min | 30 min |
| 20 AHR 50° C. 16 hrs | 30 41 | 159.6 | 261.6 | 4560 | 8160 | 10.2 | 3.6 | 11 | | 10 ml clear fluid, rest cloudy | | |
| 21 AHR 50° C. 16 hrs | 23 78-43 | 136.8 | 218.4 | 4200 | 6960 | 8.16 | 2.76 | 5 | | 10 ml clear fluid, rest cloudy | | |
| 22 AHR 50° C. 16 hrs | 55 61 | 140.4 | 237.6 | 4920 | 7440 | 9.72 | 2.52 | | 31 | | | 37 20 ml clear fluid, rest cloudy |

More formulations including MCC and other types of cationic polymers were formulated as seen in Table 14. As seen from Table 15, post crosslinking with MCC gives better results compared to the formulations containing fumed silica. In addition, the combination of MCC with a cationic PHPA having a high molecular weight does not provide fluid loss control.

TABLE 14

Formulations prepared using micro crystalline cellulose and different cationic polymers

| Sample | Addition to 60 ml CaCl$_2$ brine (dilution 50% liquor) |
|---|---|
| 23 | 3% MCC + 0.3 g HYPERFLOC ® CP 904 |
| 24 | 3% MCC + 0.3 g HYPERFLOC ® CP 904 + 0.5 ml HYPERFLOC ® CB 478 (post addition) |
| 25 | 3% MCC + 0.5 g HYPERFLOC ® CP 904 |

TABLE 15

Rheology data for formulations including micro crystalline cellulose and other types of cationic polymers

| Sample | ES | Brookfield Viscosity in cP S63 spindle | | | | | Lower BYV | PPT Sand pack 65° C., 20 psi | | | | |
|---|---|---|---|---|---|---|---|---|---|---|---|---|
| | | 100 rpm | 50 rpm | 1 rpm | 0.5 rpm | BYV | | Time to 50 ml in s | spurt | 2 min | 15 min | 30 min |
| 23 AHR 50° C. 16 hrs | 130 39 | 84 | 129.6 | 2040 | 3600 | 4.56 | 1.56 | 17 | | 20 ml clear fluid, rest cloudy | | |
| 24 AHR 50° C. 16 hrs | 70 76 | 81.6 | 127.2 | 1920 | 3600 | 4.56 | 1.68 | | 18 | 20 | 21.5 | 22.5 19 ml |

TABLE 15-continued

Rheology data for formulations including micro crystalline cellulose and other types of cationic polymers

| Sample | | ES | Brookfield Viscosity in cP S63 spindle | | | | | Lower BYV | PPT Sand pack 65° C., 20 psi | | | | |
|---|---|---|---|---|---|---|---|---|---|---|---|---|---|
| | | | 100 rpm | 50 rpm | 1 rpm | 0.5 rpm | BYV | | Time to 50 ml in s | spurt | 2 min | 15 min | 30 min |
| 25 AHR | 50° C. 16 hrs | 96 49 | 67.2 | 100.8 | 1800 | 2640 | 3.36 | 0.84 | 11 | 18 ml clear fluid rest cloudy | | | clear fluid rest cloudy |

Advantageously, embodiments of the present disclosure provide methods of reducing loss circulation by using oil-based wellbore fluids which may deliver a loss-induced trigger to seal a loss zone instantly when fluid loss occurs. The use of the modified brine phases in the wellbore fluids of the present disclosure, which may coalesce and form a seal on the walls of the formation, advantageously allows for reducing fluid loss control. As noted above, the final seal may be enhanced by add-on chemistry and/or tool activation. The fluids disclosed herein are useful in drilling, completion and working over of subterranean oil and gas wells.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method of reducing loss of wellbore fluid in a wellbore to a formation, comprising:
    pumping an oil-based wellbore fluid into the wellbore, the wellbore fluid comprising an oleaginous continuous phase and a plurality of modified brine phases dispersed in the oleaginous continuous phase, where the brine phases are modified such that upon the wellbore fluid undergoing fluid loss to the formation, the modified brine phases coalesce and form a seal on the walls of the formation;
    where the modified brine phase further comprises a polymer solution; and an added crosslinker.

2. The method of claim 1, wherein the modified brine phases comprise a polymer selected from the group of cationic partially hydrolyzed polyacrylamides, polyamines, linear and branched polyethylene imines and polymers with carboxylate functional groups.

3. The method of claim 1, wherein the crosslinker is selected from the group of epoxies, isocyanates, carbodiimide, aziridine and oxazoline.

4. The method of claim 1, wherein the crosslinker is selected from the group of compounds containing Al, Ti and Zr ions.

5. The method of claim 4, wherein the crosslinker is aluminium chlorohydrate.

6. The method of claim 1, wherein the modified brine phases further comprise particulate enhancements selected from the group of nano sized materials, fumed silica, fibers and microcrystalline cellulose.

7. A method of reducing loss of wellbore fluid in a wellbore to a formation, comprising:
    pumping an oil-based wellbore fluid into a wellbore, the oil-based wellbore fluid comprising:
        an oleaginous continuous phase;
        a plurality of gelled brine phases emulsified in the oleaginous continuous phase wherein the gelled brine phase comprises a dispersed polymer; and
        an added crosslinker.

8. The method of claim 7, wherein upon the wellbore fluid undergoing fluid loss to the formation, the plurality of gelled brine phases coalesce and form a seal on the walls of the formation.

9. The method of claim 7, wherein the dispersed polymer is selected from the group of cationic partially hydrolyzed polyacrylamides, polyamines, linear and branched polyethylene imines and polymers with carboxylate functional groups.

10. The method of claim 7, wherein the crosslinker is selected from the group of epoxies, isocyanates, carbodiimide, aziridine and oxazoline.

11. The method of claim 7, wherein the crosslinker is selected from the group of compounds containing Al, Ti and Zr ions.

12. The method of claim 11, wherein the crosslinker is aluminium chlorohydrate.

13. The method of claim 7, wherein the gelled brine phases further comprise particulate enhancements selected from the group of nano sized materials, fumed silica, fibers and microcrystalline cellulose.

14. The method of claim 7, further comprising allowing the wellbore fluid to enter a lost circulation zone and to form a seal or a plug at an entrance of a fracture, fissure or vug or inside a fracture, fissure or vug, thereby reducing the loss circulation.

15. A method of reducing loss of wellbore fluid in a wellbore to a formation, comprising:
   pumping an oil-based wellbore fluid into a wellbore, the oil-based wellbore fluid comprising:
      an oleaginous continuous phase; and
      a plurality of modified brine phases having particulate enhancements emulsified in the oleaginous phase wherein the particulate enhancements are selected from the group of nano sized materials, fumed silica, fibers and microcrystalline cellulose.

16. The method of claim 15, wherein upon the wellbore fluid undergoing fluid loss to the formation, the plurality of brine phases coalesce and form a seal on the walls of the formation.

17. The method of claim 15, further comprising allowing the wellbore fluid to enter a lost circulation zone and to form a seal or a plug at an entrance of a fracture, fissure or vug or inside a fracture, fissure or vug, thereby reducing the loss circulation.

* * * * *